April 13, 1965 S. R. POLLACK 3,178,594

TUNNELING THIN FILM SIGNAL TRANSLATING DEVICE
HAVING ONE OR MORE SUPERCONDUCTING FILMS

Filed June 27, 1962 2 Sheets-Sheet 1

INVENTOR
SOLOMON R. POLLACK

BY David Teschner

ATTORNEY 3,178,594

TUNNELING THIN FILM SIGNAL TRANSLATING DEVICE HAVING ONE OR MORE SUPERCONDUCTING FILMS

Solomon R. Pollack, Philadelphia, Pa., assignor to Sperry Rand Corporation, New York, N.Y., a corporation of Delaware Filed June 27, 1962, Ser. No. 205,622
4 Claims. (Cl. 307—88.5)

This invention relates to a signal translating element and more particularly to a signal translating element capable of operating at superconductive temperatures.

For many applications today, computers constructed in accordance with present techniques that are not suitable, in that proportionately they require large amounts of room, require great amounts of power, air conditioning, rigid mounting systems and constant climatic conditions. These general requirements cannot be provided at all, or, if provided, are provided at great expense in requiring additional space and facility not normally available at the place which the computer is to be employed. For example, in applications such as aircraft, rockets, missiles or submarines, the space and auxiliary facilities made available for use with the computer are extremely limited. If it were necessary to increase the space which might be conveniently allocated, it would require the complete re-designing of the vehicle in which the computer was to be housed. In many instances, this re-designing of the vehicle would be impossible or at best extremely expensive. In a similar manner, the additional auxiliary facilities to protect the computer environment as to temperature and climatic conditions as well as to supply necessary operating power, mounting support and maintenance facilities, would place an even greater burden upon the vehicle in which the computer was to be placed. Thus, for many of these special purposes, it is quite necessary to devise a computer which is smaller in physical dimensions and will limit or completely eliminate many of the auxiliary elements which are necessary for its correct operation. This, however, does not necessarily permit a reduction of the computer merely by eliminating many of the devices which are necessary to its operation. The size of the computer must be reduced without a loss of required computational and input and output facilities. Current practices of miniaturization and microminiaturization have gone a long way to reducing the size of the computer from the size of its early predecessors. However, due to the extending of the facilities of the computer and its accessory equipment, very little overall reduction in the size of the device has been achieved.

One approach which appears to offer the ideal solution to the above-mentioned problems is the use of devices which operate in the super-conductive temperature region (that is, at temperatures close to absolute zero, at which the materials employed show a substantially complete absence of resistance). The reason for this interest is the extremely compact size of the particular elements which can be employed, as well as the low power requirements and the utter simplicity of the device. Certain of the devices well known in the art as cryotrons require merely a small central conductor with a winding placed about it. These elements are so small in size that a dozen or so could be easily placed at the end of one's finger. The elements themselves require no heater power; that is they do not require a heater supply similar to that which might be required of a vacuum tube or a bias supply required of a transistor, and further require no plate supply. Thus it can be seen that the device, for operation, requires very little auxiliary power, and thus limits or greatly reduces the problem of climatizing and air conditioning to keep the device at its proper temperature and to prevent the unwanted increase in temperature in the surrounding areas. The device may be easily and cheaply fabricated using automatic machinery techniques. The signal power, that is the power itself required to conduct signal information is also extremely low because of the particular physical properties of the devices involved. Further, due to the fact that there are no moving parts and also that the device does not depend for its operation upon the emission of electrons from a particular device such as a cathode, long life and consistently high performance is possible.

Increased research into the basis of operation of these devices has permitted the development of more sophisticated superconducting devices which permit greater flexibility of operation than the earlier crude types of cryogenic devices set out above. These techniques involve the depositing of thin films of materials capable of showing the superconducting characteristic feature of substantial loss of resistance at low temperature, and they conveniently, by arranging for a variety of films in a variety of organizations, provide a wide range of logical elements.

In a preferred embodiment, the invention consists of basic unit constructed of a plurality of thin films insulated from one another in which one or more of those films may act as a control for the operation of the remaining films. The material selected for the films may be such as to permit one or more of the films to be operated within the superconductive region. The energy levels within the respective films are established in conformance with the basic characteristic of the material used and are so picked that under normal conditions it is not possible for electrons to move from a first film through a control film to a further film. However, upon application of a pulse of proper amplitude and polarity, the energy level of the control film may be altered to a point permitting the movement of electrons from one film through the control film to a further film by a procedure known as tunneling. Output circuits may then be provided to detect the flow of current through the device as a result of this electron movement. By the proper arrangement and selection of a plurality of films and insulating films, it is possible to make the device perform a wide variety of logical functions. For example, by merely selecting three films separated by two insulators in a stacked wafer arrangement, it is possible to construct a device which operates in a manner similar to a triode. Further, by employing five film layers separated by four insulating films, a device similar in operation to the pentode may be created. Other arrangements permit the use of a plurality of films to produce direct logical functions such as the logical "NOR" function.

It is therefore an object of this invention to provide a signal translating element capable of operating at superconductive temperatures.

It is a further object of this invention to provide a signal translating element in which one or more of the components of such a device are in a superconducting state.

It is a further object of this invention to provide a superconducting signal translating element which operates according to the principle of electron tunneling.

It is yet another purpose of this invention to provide a superconducting triode gating and amplifying device which may be constructed employing thin film techniques.

It is still another purpose of this invention to provide a superconducting pentode gating and amplifying device which may be constructed employing thin film techniques.

It is yet another object of this invention to provide a superconducting gating and amplifying device which may be constructed of a plurality of thin film layers, the number of which is dependent upon the gating function desired to be performed.

Another object of this invention is to provide a signal translating device which is simple to construct, small in overall physical size and requires low power for operation.

It is still another object of this invention to provide computer signal translating and gating elements which may be constructed in accordance with a desired logical function from superconducting elements which operate by tunneling techniques.

Other objects and features of the invention will be pointed out in the following description and claims, and illustrated in the accompanying drawings which disclose, by way of example, the principle of the invention and the best mode which has been contemplated for carrying it out.

In the drawings.

Similar elements are given similar reference characters in each of the several drawings.

Figures 1, 2, 3, 4:
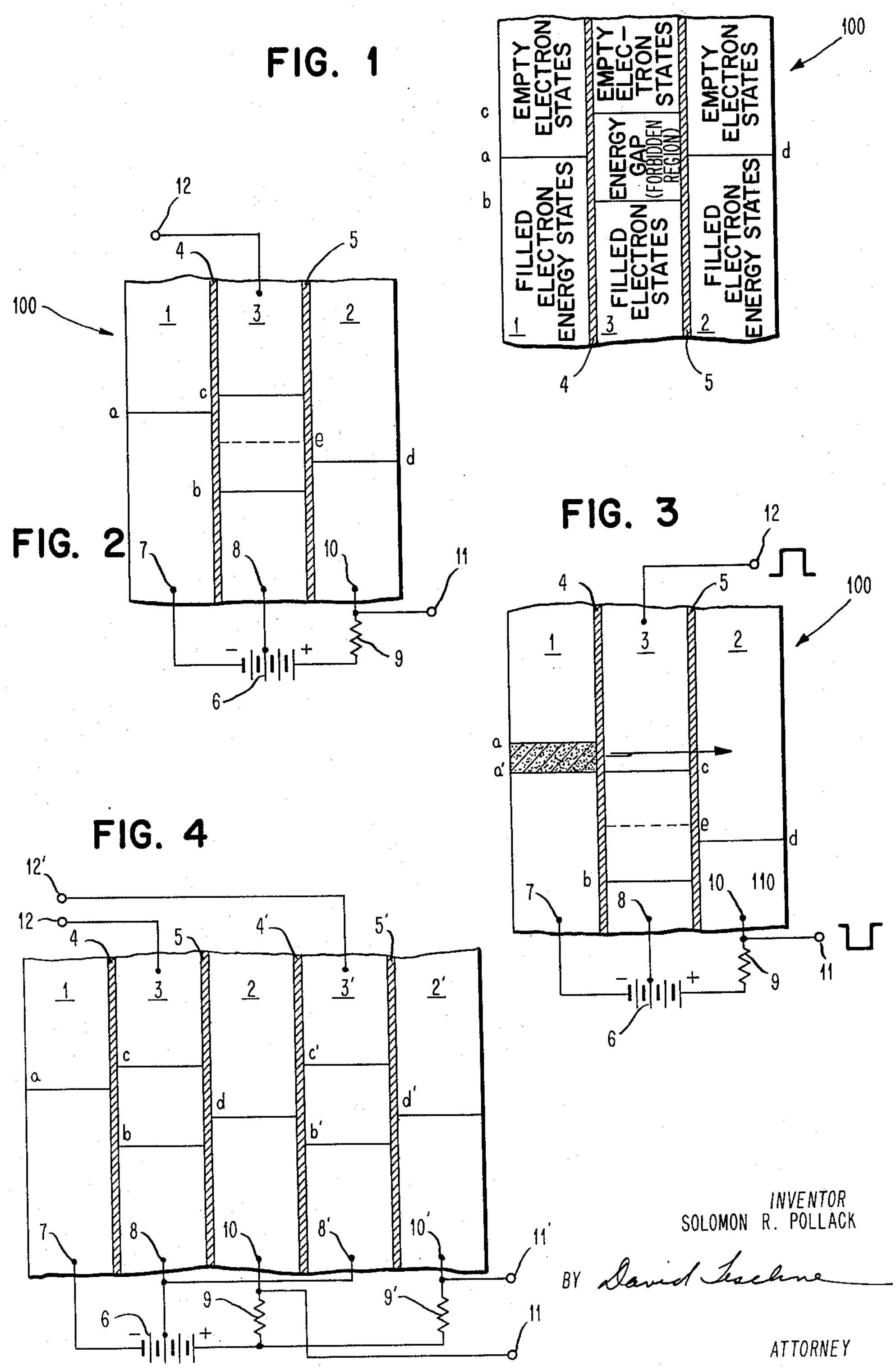
FIGURE 1 illustrates in diagrammatic form a device constructed in accordance with the basic concept of the invention in its natural non-conducting form without any type of bias applied, and indicating the electron energy levels of its component parts.
FIGURE 2 illustrates a further diagrammatic representation of the device constructed in accordance with the basic concept of the invention and showing the application of a bias supply and the resultant electronic energy levels.
FIGURE 3 illustrates a further diagrammatic representation of the invention showing the application of an input pulse and the resultant electronic energy levels and outputs.
FIGURE 4 illustrates in diagrammatic form a modification of the invention shown in FIGURE 1 capable of producing further signal translating functions.

Referring now to FIGURE 1, there is shown a diagrammatical representation of a super-conducting three-film device 100 constructed in accordance with the invention. The device consists of a first film 1 and a second film 3 separated by an insulating film 4. An insulating film 5 is used to further separate the film 3 from a film 2 placed to the immediate right of the film 3. The film 1 is shown to have filled electron energy states to a level indicated at the line *a*. The areas immediately above the filled electron energy states are designated as empty electron states; the line representing the separation between such empty electron states and filled electron energy states is known as the Fermi level. As an example of what is meant by the empty and full electron states, the following example is given:

If a valence level can accept two electrons but contains only one, it is considered half full or partly empty and can thus accept an additional electron to fill the particular valence level. However, in the same example, if the valence level contains two electrons, then the material is full and can no longer accept additional electrons. Thus, the area designated above the Fermi level line *a* is considered to have at least one or more empty positions in its valence level whereas the area designated filled electronic energy states below the Fermi level line *a* is considered to have complete or full valence levels. The film 3 consists of 3 electron energy regions, a first below the line *b*, a second between the line *b* and the line *c*, and a third above the line *c*. It should be pointed out at this point that the representations of the particular energy levels shown in the drawings is merely illustrative of the principles involved. It should also be understood that these energy levels are present in the materials naturally, that the materials employed are selected according to these characteristics as desired by the particular use to which the device is to be put. The area below the level *b* of the film 3 is found also to contain filled electron energy states. The entire film 3 is operated in the superconducting region; that is, the material is held at a temperature sufficiently close to absolute zero to permit the material to act as a perfect conductor showing substantially no resistive properties, as set forth above. A superconducting material is employed, in that it permits a sharp and well defined energy region between the filled and empty states. The barrier between the lines *c* and *b* of the film 3 is designated as an energy gap or forbidden region. Midway between the levels *c* and *b* which describe the upper and lower limits of the forbidden energy region is the Fermi level *e* for the super conducting material of film 3. As far as the electrons of the superconducting material or the film 3 are concerned, no electron within the superconducting film could possibly exist with an energy characteristic of this particular region. Therefore, no electron found within the material of film 3 could possibly occupy the position in such a forbidden region. It should be pointed out at this time that the placement of the various energy levels is in conformance with the relative states of electronic energy and are so arranged that as one views the figure from the bottom of the drawing to the top, he is tracing a path of increase in the electron energy level. Thus the area found above the line *b*, that is, the energy gap or forbidden region of the film 3, is a level of higher electron energy than that below the line *b*. The area of the film 3 found above the line *c* contains empty electron states wherein the valence levels of the particular materials can accept additional electrons; that is, it has empty positions in such valence levels. A third film designated as 2 is composed of two energy regions; a first region of filled electron energy states below the *d*, and a further area of empty electron states above the line *d*. These areas are similar in effect to those described with reference to film 1 and are separated by the line *d* which represents the Fermi level for this particular material. Thus, when considering the representation of FIGURE 1 as a whole, the following things are evident:

(1) The filled electron energy states of the films 1 and 2 exist at higher levels than that of the film 3;

(2) The empty electron energy states of the films 1 and 2 exist at lower energy levels than that of film 3; and (3) The energy gap or forbidden region of the film 3 exists in such a position as to prevent any direct transfer of electrons from the filled states of film 1 to the filled states of film 2.

Referring now to FIGURE 2, there is shown the device of FIGURE 1 altered in the following manner: A bias supply consisting of a battery element 6 is connected into various films in the following manner; a lead 7 connected to the negative side of the battery 6 is connected to the film 1 to increase negatively the energy level within such a film; that is, to increase the energy level of the filled electron energy states within the film 1. This is shown by the relative displacement of the line *a* of film 1, in FIGURE 2, with respect to its position in FIGURE 1. The battery 6 further is connected to the film 3 at the terminal point 8. This supplies a positive voltage, relative to film 1, to the film designated 3 thus, in effect, aiding in the decrease of the energy levels of the portion designated energy gap or forbidden region. In other words, the addition of a positive voltage to this film 3 will tend to decrease all the energy levels of the film 3 relative to those of film 1 and 2. This may be seen by comparing the positions of the lines *b* and *c* of FIGURE 2 with their respective positions shown in FIGURE 1. The positive terminal of the battery 6 is connected through a resistor 9 to a terminal 10 of the film 2. The effect of this positive voltage which is applied to the film 2 is to decrease the level of energy as shown by the lowering of the Fermi level designated *d*, thus lowering the relative positions of the areas of empty and filled states. The reasons for the relative polarities of the bias batteries shown in FIGURE 2 will soon be made evident. A terminal point 11 is connected to the terminal 10 to provide an output indicative of the current flowing through the resistor 9 as a result of the operation of the device. An input terminal 12 is provided to the thin film designated as 3, and is shown schematically in FIGURE 2.

The thin film superconducting device described above may be constructed employing, for example, gold as film 1, aluminum as film 2 and lead as film 3, and as the insulating members 4 and 5, aluminum oxide that is, $Al_2O_3$ and operating the entire device in the region of 4.2° K. At this particular temperature of operation, only central film 3, the film constructed of the lead, is at a superconducting temperature. The other materials remain in their non-superconducting state. It should be further understood, however, that these particular materials are not the only ones of which this device may be constructed and that a wide variety of other materials may suitably be employed such as: 3 lead films with aluminum oxide insulating means may also be used, the entire device again being operated at 4.2° K. However, in this particular embodiment, all of the three films would be operated in their superconducting regions. It should also be realized that, in addition to the metal designated as 3 being superconducting, films 1 and 2 may also be superconducting giving a pattern wherein any combination of the films may be superconducting as long as the film 3 is superconducting under all possible combinational conditions. This is necessary, that is, film 3 being superconducting, to provide for the necessary gating and control functions that the film exhibits in accordance with this concept of the invention. It should also be noticed that the lead used as film 3 may be changed to some other material, and that as a result, the temperature at which the material will be superconducting and therefore the device will be operated, will be changed according to the properties of the required metal. Under the conditions set forth for the first or preferred embodiment, that is, the one containing the films of gold, lead, and aluminum at a temperature of 4.2° K., only the lead central member is found to be superconducting. The other two metals are normal. That is, they have a non-zero resistance at a temperature of 4.2° K. Further, the material designated as the insulator, in the example above, may be any other thin film insulating device such as vinyl acetal resin, silicon monoxide or any other similar material. As a matter of practical significance, it is the choice of the particular insulator that will properly determine the optimum characteristic of the device, in that the properties and the respective thicknesses of the insulator will have a greater significance on the electron transfer which is possible in the device. The insulator thickness employed at the regions designated 4 and 5 is of the order of $50 \times 10^{-8}$ centimeters. The relative thicknesses of the films 1, 2 and 3 are of the order of several thousand angstroms ($10^{-8}$ cm.) for films 1 and 2 and of the order of $10^{-6}$ cm. for film 3. For the configuration indicated, that is, employing lead as the central film 3, the voltage supply will be of the following approximate values: The voltage between the films 1 and 3 will be approximately —.5 millivolt to —1.2 millivolts, whereas the voltage between the film 3 and the film 2 will be in the range of —.5 millivolt to —1.2 millivolts. Thus, if the voltage between the films 1 and 3 exceeds in a negative sense, 1.2 millivolts, the device will conduct. It should be understood, that if some other configuration, that is, a different superconductive material is used as film 3, the bias voltages accordingly will have to be changed. The value of the bias selected will depend upon the energy gap of the superconductor and in the example used, that is, lead, the bias will be approximately equal to —1.2 millivolts so that this will determine the upper limit of the voltage between films 1 and 3 for non-conduction and also the upper limit of the voltage between the films 3 and 2.

An inspection of FIGURE 2, when compared to FIGURE 1, will show the following:

(1) The relative position of the Fermi level in film 1 has been raised, that is the areas have been displaced upwardly as a result of the negative bias applied;

(2) The energy levels of film 3 have been lowered as an effect of the positive bias applied; and (3) The relative positions of the Fermi level in the film 2 has been lowered, that is the areas have been disposed downwardly as a result of the positive bias applied.

Referring now to FIGURE 3, the electron energy levels of the various films of the superconductive device are shown as a result of the introduction of an input pulse on the line 12 through the film 3. As a result of the introduction of a positive pulse to this area, the electronic energy levels in the film 3 are all depressed. The value of the input pulse ($|V_{input}|$) at the terminal 12 would have to exceed the energy gap voltage $Eg$ divided by 2 minus the bias voltage between the films 1 and 3, namely ($|V_{13}|$). Thus $|V_{input}| > (|Eg$ divided by $2 - |V_{13}|)$. The magnitude of the $V_{input}$ must also not exceed the combined voltage difference between the films 1 and 2, namely ($|V_{12}|$) for operation as a gate. Hence, $|V_{input}| < |V_{12}|$, where $V_{12}$ represents the magnitude of the voltage between the films 1 and 2 and $V_{13}$ represents the voltage between the films 1 and 3, $V_{input}$ represents the input voltage at the terminal 12 and $Eg$ represents the voltage of the energy gap of film 3. Stated another way, the Fermi level $e$ of film 3 should not be brought, by the combined effects of the bias supply and the input pulse to a level below the Fermi level $d$ of film 2 for proper tunneling operation. To force the Fermi level $e$ of film 3 lower than the Fermi level $d$ of film 2 will permit the flow of electrons from film 2 to film 3 and prevent proper operation. The values of these respective voltages have been set forth above. A comparison of the levels indicated as $c$ and $a$ for the respective films 3 and 1 in the FIGURE 3, show that the level $c$ is now in a position which is lower than that occupied by the Fermi line or line $a$ of film 1. This is quite a different condition than that shown for the same level lines with respect to FIGURE 1 wherein the line $c$ designating the upper boundary of the energy gap of the film 3 is significantly higher than the line indicating the Fermi level, that is line $a$ of the film 1. Thus, as shown in FIGURE 3 there is now an area between the levels indicated as $a$ and $a'$ and shown as crosshatched in the drawing, which exceeds the energy level of the gap of the film 3. Thus, the superconducting energy gap of film 3 is no longer a barrier to the movement of electrons from film 1 to the film 2. As a result of the displacement of the energy gap as shown in the FIGURE 3 those electrons in the area $a$ and $a'$ which electrons exceed the energy level of the energy gap of film 3 are now free to tunnel through the insulating barrier 4 from the film 1 to the film 3 and to further pass through the barrier 5 from the film 3 to the film 2 as shown by the arrow in the FIGURE 3. Thus the electrons of film 1 are now made available to film 2 to fill a portion of the empty electron states in accordance with a number of empty electron states which are available above the Fermi level $d$ of the film 2 and the number of electrons available in the area $aa'$ which exceed the energy gap of the film 3. This transfer of electrons will continue from the film 1 to the film 3 to the film 2 so long as the energy level in the film 1 exceeds that of the energy level in films 3 and 2 and as long as there are empty electron states in the film 3 to receive the electrons. A conventional current will be found to traverse the resistor 9 in such a condition as to give a negative output pulse as is shown in the FIGURE 3. Thus it can be seen that the device in operation has its output from the film 2 electrically isolated from the input of film 3 and further that the device operates as an inverting device employing a positive pulse to produce a negative pulse at the output. The device can be likened to a standard triode in that the film 1 acts as the cathode, whereas the film 2 acts as the plate and the film 3 acts as the grid. Upon application of a proper input voltage, that is the pulse end on the terminal 12, the grid can be made to permit the flow of electrons from the cathode to the plate to produce a required output.

In a similar manner the number of layers of the device that is alternating films of non-conducting normal and superconducting materials or placing a number of layers of superconductive materials with proper bias arrangements make possible the production of devices to produce a variety of other additional gating functions. Such an additional arrangement is shown in FIGURE 4 wherein a pentode type of arrangement or a multiple input gating device is depicted. This device consists of a film 1 similar in function to that set forth with reference to FIGURES 1, 2 and 3 an insulating film 4 next to it a further film 3 an insulating member 5 a film 2 an additional insulating member 4′ a further film 3′ an insulating film 5′ and a final film 2′. The energy levels of the films 3′ and 2′ are similar to those of the films 3 and 2 respectively. The biasing arrangement is modified from that shown with reference to FIGURES 2 and 3 in that it includes in addition the positive bias supply to the film 3′ connected at a terminal 8′ and a positive connection through a resistor 9′ to a terminal 10′ of the film 2′. Provision is made to take an output from the final film 2′ at the terminal 11′. Inputs are provided to the terminals in the usual manner specified above by applying a positive pulse to the input terminal 12 to the film 3 and additionally providing another input terminal 12′ to accept a positive pulse and conduct it to the input of the film 3′. In operation this device is operated at a temperature of 4.2° K. when constructed of films of gold, lead and aluminum as set forth above so that the films 3 and 3′ are operated in their superconducting regions whereas the films 1, 2 and 2′ remain non-superconducting. Upon the application of a pulse to the terminal 12 an output will be received at the terminal 11 as set forth with reference to FIGURE 3. In addition the application of a pulse to the terminal 12′ may result in the production of an output pulse at the terminal 11′ under the following manner of operation. If a pulse is introduced at the terminal 12 only then an output pulse will be received at the output terminal 11 but nothing will be received at the terminal position 11′ the tunneling of electrons being prevented through the barriers or insulating films 4′ and 5′ due to the high level of the energy gap as shown in the FIGURES 1 and 2. However, upon the application of an additional positive pulse to the terminal 12′ the energy gap is displaced in the manner described above to permit the further tunneling of electrons from film 1 through the barriers 4′ and 5′ to produce a pulse at the output 11′ in a manner similar to that described with reference to FIGURE 3. Thus it can be seen that the device operates as a pentode using the analogy of a vacuum tube. Film 1 acts as the cathode, film 3 acting as the grid, film 2 acting as the screen, film 3′ acting as the suppressor and film 2′ acting as the plate. Thus upon concurrent application of the pulses to the grid and the suppressor that is the films 3 and 3′ a signal will be produced at the plate terminal 11′ as well as the signal produced at the terminal 11. This manner immediately suggests the operation of the device as a logical inverting "And" circuit for if inputs are placed on both of the terminals 12 and 12′ an output will be produced at the terminal 11′. Extending this principle as far as desired additional logical elements may easily be fabricated. It is noted that in this configuration, the thickness of film 2 will be very much thinner than in the triode configuration and will be of the order of $10^{-7}$ to $3 \times 10^{-7}$ cm. thick.

Figure 5:
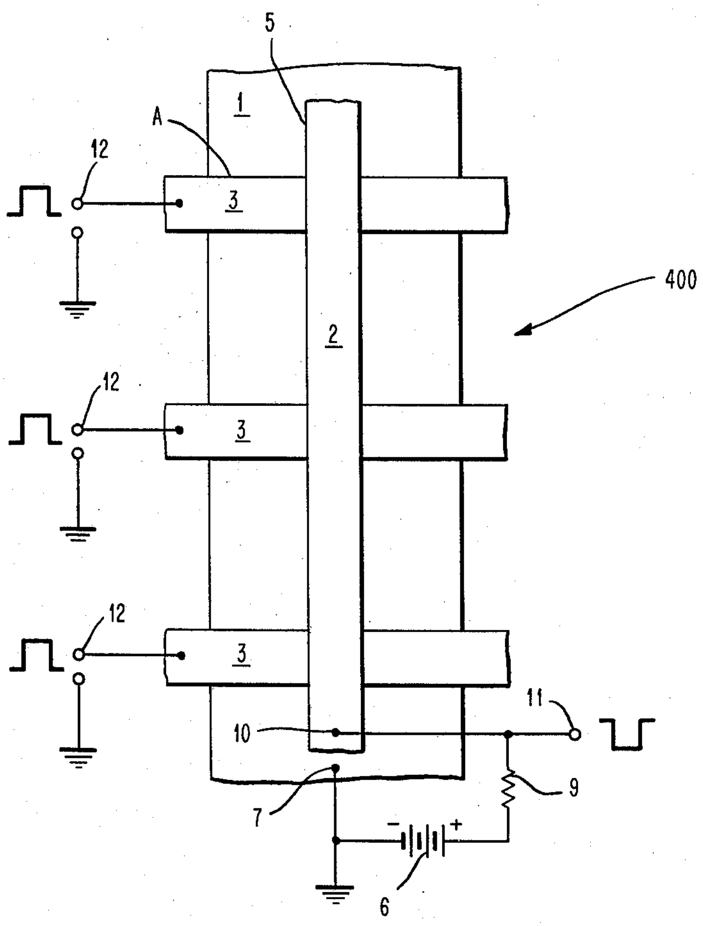
FIGURE 5 illustrates in diagrammatic form a multi-input logical gate constructed in accordance with the concepts of the invention.

A further gating arrangement is shown in the FIGURE 5 to provide the logical "NOR" function. This device designated 400 consists of a main member composed of film 1. Over the length of the film 1 and perpendicular to it are placed a plurality of films 3 properly insulated at their areas of contact with film 1 by an insulating film 4 (not shown). On top of the films 3 is placed a film 2, placed parallel to the film 1 and insulated at areas of contact with film 3 by means of the insulating film 5 (not shown). The film 5 is also used to insulate the film 2 from film 1 where they overlap but do not normally touch. In this manner film 5 also serves to support film 2 along these areas. A bias battery supply 6 is connected to provide a negative bias on the film 1 via terminal 7, which is also grounded. A positive bias on the film 2 is applied via a resistor 9 to the terminal 10. A negative pulse will be produced on the output terminal 11, connected at the non-battery side of resistor 9, when a positive input pulse is provided to any of the input terminals 12 of the films 3. The output results from the operation of any of the individual units as a gate as set forth above. Since any or all of these individual devices when operating, produces an output pulse at the common terminal 11 the unit as a whole can be considered as a logical "NOR" gate. Such a gate is defined as producing a negative output for any one or combination of positive inputs. The output will be analog in form, that is to say, it will be of one discrete level if one input is present, a second discrete level if two inputs are present etc. This output however, may be clamped by means of a diode, as is well known in the art, to limit the input to a single level regardless of the number of inputs present. It is obvious that this device can be extended to any desired number of inputs merely by increasing the lengths of the films 1 and 2 and providing sufficient numbers of the film 3. It should be noted in this arrangement that no positive bias is applied to the films 3 in the embodiment of FIGURE 5, as in the preceding figures in that such an arrangement would prevent isolation of the separate inputs and place a positive bias thereon. In the instant configuration, however, the inputs to the various films 3 are applied between input terminals 12 and ground and the film 1 is similarly grounded. Thus a reference of ground is used rather than the bias values employed in the previous figures. The manner of operation of the device will, however, be similar to that described with reference to FIGURE 3. The input signals to film 3 (superconducting) will cause the translation of the energy gap and permit electron tunneling from film 1 to film 2. This change in the reference is necessary to allow isolation of each of the films 3 from each other. In the event a bias arrangement were used whereby each film 3 was tied to a common positive bias, an input to any film 3 would have the effect of translating the energy gaps in all of the films 3 regardless of the state of the inputs to the various films 3. Thus, upon the application of a positive input to any one or more input terminals 12 a negative output signal will be produced at the output terminal 11.

It will be understood that various omissions and substitutions and changes of the form and detail of the device illustrated and its operation may be made by those skilled in the art, without departing from the spirit of the invention.

The embodiments of the invention in which an exclusive property or privilege is claimed are defined as follows.

I claim:

1. A signal translating device comprising a first thin film member; a plurality of second thin film members mounted atop said first thin film member and maintained in the superconducting temperature range; a third thin film member mounted atop said second thin film members; means to insulate the contact points of said first and second and said second and third film members respectively; first means to bias said first and third film members to distinct electron energy levels; a plurality of second means, each connected to a separate one of said second film members to change the electron energy level of said second film members and permit the transfer of electrons from said first to said third film members; and third means to produce an output indicative of said transfer of electrons.

2. A signal translating device as defined in claim 1, wherein said first and third thin film members may be any metal; said second thin film members may be any metal which becomes superconducting below 15° Kelvin; and said means to insulate is an electrically insulating compound.

3. A signal translating device as defined in claim 1, wherein said first thin film member comprises a metal selected from the group consisting of gold and lead; said second thin film members are lead; said third thin film member comprises a metal selected from the group consisting of aluminum and lead; and said means to insulate comprises an electrically insulating compound selected from the group consisting of aluminum oxide, silicon monoxide and vinyl acetal resin.

4. A logical "NOR" circuit comprising a first thin film member; a plurality of second thin film members mounted atop said first thin film member and maintained in the superconducting temperature range; a third thin film member mounted atop said second thin film members; means to insulate the control points of said first and second and said second and third film members respectively; first means to bias said first and third film members to distinct electron energy levels; a plurality of second means, each connected to a separate one of said second film members to change the electron energy level of its associated one of said second film members and permit the transfer of electrons from said first to said third film members; and third means to produce an output indicative of said transfer of electrons, whereby an output is available when any one or a combination of said second means are changing the energy levels in their associated second film members.

References Cited by the Examiner

UNITED STATES PATENTS

| | | | |
|---|---|---|---|
| 3,056,073 | 9/62 | Mead | 317—234 |
| 3,116,427 | 12/63 | Giaever | 307—88.5 |

OTHER REFERENCES

Pub. 1, "Tunneling Observed in Supercooled Thin-films," in Electronics Newsletter, dated Nov. 25, 1960, page 11.

ARTHUR GAUSS, *Primary Examiner.*